Aug. 20, 1968   J. G. FRAYNE ETAL   3,397,936

STANDING WAVE ULTRASONIC LIGHT CELL MODULATOR

Filed Nov. 15, 1963   3 Sheets-Sheet 1

INVENTORS
JOHN G. FRAYNE
HARRY P. BRUEGGEMANN

ATTORNEY

INVENTORS
JOHN G. FRAYNE
HARRY P. BRUEGGEMANN
ATTORNEY 3,397,936
STANDING WAVE ULTRASONIC LIGHT
CELL MODULATOR
John G. Frayne, Pasadena, and Harry P. Brueggemann,
San Marino, Calif., assignors to The Marquardt Corporation, Van Nuys, Calif., a corporation of California
Filed Nov. 15, 1963, Ser. No. 324,045
6 Claims. (Cl. 350—161)

ABSTRACT OF THE DISCLOSURE

A cell containing a liquid is located transversely of a path of radiant energy and acoustical energy is transmitted through the liquid from two opposed sources to produce a standing wave pattern in the liquid due to cavitation therein to diffract the radiant energy.

This invention relates to apparatus for modulating a beam of radiant energy in response to a varying electrical input signal, and more particularly to a modulator cell having controllable diffraction of the radiant energy passing therethrough in response to ultrasonic means which establish cavitation patterns in a liquid within the cell.

The practical implementation of large screen, real-time, high resolution, image displays necessitates modulation of a high intensity light source. And, in order to display a television image, the bandwidth of the modulating means must be of the order of several megacycles per second. Various light valve means have been proposed heretofore for accomplishing this function. A typical one of these prior devices is the Debye-Sears light cell modulator which employs ultrasonically generated pressure waves in a liquid-filled light cell in order to provide localized variations in the index of refraction of the liquid. These refractive anomalies in the light path will provide modulation of the light passing therethrough which can be detected by Schlieren optics. Devices of this type employ a modulated (ultrasonic) carrier which travels in the liquid at the speed of sound; this carrier must be "followed" by a rotating mirror or other scanning means in order to immobilize the light image on the display device. To achieve this following action requires high speed rotation of the scanning mirror and in a practical television system requires synchronization between the mirror and the video sync signal to less than one microsecond. Due to the relative inefficiency and the extremely complex nature of devices of this type, large-screen image display devices based on this principle have not achieved commercial acceptance. The apparatus of the present invention overcomes the deterrents to commercial success of prior devices. In particular, the apparatus of the present invention immobilizes the video signal by means of a pattern of cavitation bubbles in the liquid within the cell, thus obviating rotating mirrors or other complex mechanical scanning means. Furthermore, the resolution obtainable by cavitation is substantially better than prior ultrasonic light cell modulators.

In the operation of the modulator cell of the present invention, lines or ensembles of extremely small bubbles are formed by cavitation induced in the liquid filling the cell, along the plane of symmetry of the cell. In a typical construction, cavitation is effected by means of arrays of piezoelectric transducers contiguous with opposing walls of the cell. The cell is transparent in a direction transverse to the transducer arrays. Energy supplied to the arrays will cause cavitation in the liquid and thereby result in refractive anomalies in the transverse light path. As a result of these anomalies, light rays entering the cell will be diffracted horizontally through an angle which is dependent upon the wavelengths of the energizing ultrasonic sound and the light from the source. The light leaving the cell is then imaged by suitable optical lens means into a typical Fraunhofer diffraction pattern. The undiffracted white light is blocked by one or more opaque bars (grating) placed beyond the lens means. The diffracted light, in the form of first and second spectral order bands, is allowed to pass by the opaque bar. An objective lens means, receiving only the diffracted light, directs the image from the cell onto a screen placed beyond the lens. There will then appear on the screen, a narrow horizontal line which is modulated along its length in accordance with the pattern of cavitation bubbles generated within the cell. Wherever there are bubbles in the cell, there will be light on the screen. The percentage of light diffracted is approximately proportional to the number of bubbles at any point in the cell. If there are many bubbles at some point, there will be greater light on the screen; with fewer bubbles, less light. This horizontal line represents one video scan. Since the horizontal line of light on the screen is modulated along its length, no auxiliary means are required to immobilize or follow the video signal.

It is, therefore, a principal object of the invention to provide novel and improved means for modulating radiant energy.

Another object of the invention is to provide novel and improved means for generating a modulated line scan of radiant energy.

Still another object of the invention is to provide novel and improved ultrasonic light cell apparatus.

Yet another object of the invention is to provide light valve apparatus employing cavitation phenomena to modulate light passing therethrough.

It is another object of the invention to provide a novel and improved light cell modulator which employs standing waves in the cell medium to induce cavitation and thereby immobilize a video signal for the duration of a single sweep.

An object of the invention is to provide novel and improved apparatus useful in displaying real-time, brilliant, large-screen, high resolution image displays.

Another purpose of the invention is the improvement of light cells, generally.

A general object of the invention is to provide novel and improved radiant energy modulating apparatus which overcomes disadvantages of previous means and methods heretofore intended to accomplish generally similar purposes.

Many other advantages, features and additional objects of the present invention will become manifest to those versed in the art upon making reference to the detailed description and the accompanying sheets of drawings in which a preferred structural embodiment, incorporating the principles of the present invention is shown by way of illustrative example.

As stated hereinabove the apparatus of the present invention may be used to provide a horizontal scan or trace of a television image in response to an input video signal. The immobilization of the video signal at the display device, for the duration of a single sweep, is accomplished by using cavitation induced by a standing wave pattern in the liquid in the cell, thus obviating the use of a rotating mirror. Details of construction of an ultrasonic light cell to accomplish this are shown in FIGURE 1.

Figure 1:
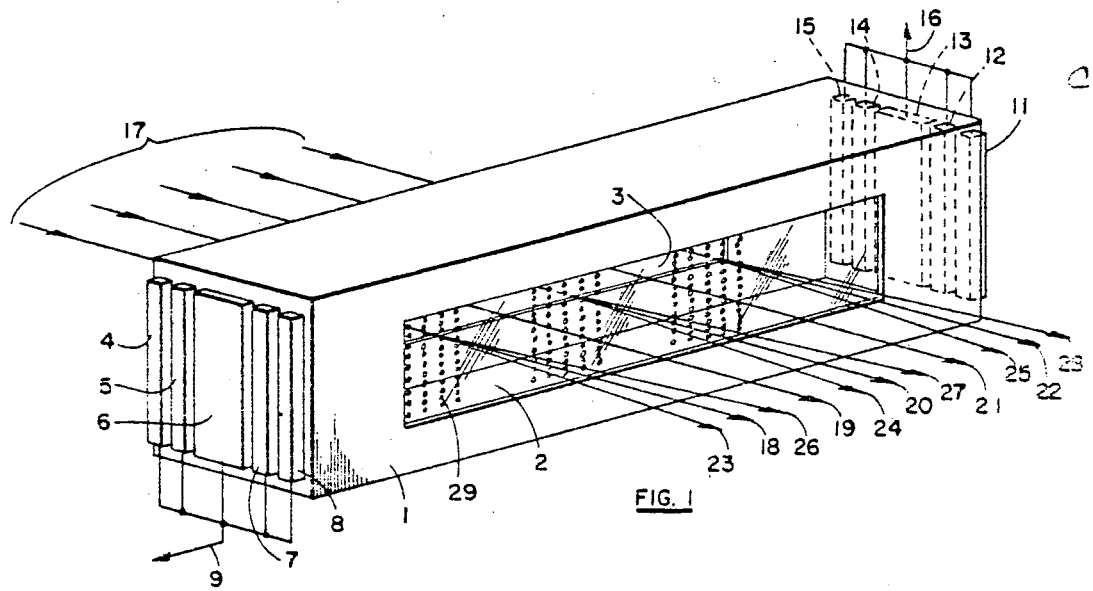
FIGURE 1 is a somewhat diagrammatic perspective view of an ultrasonic light cell modulator according to the invention.

Looking now at FIGURE 1, the apparatus comprises a liquid enclosing container 1 having a pair of co-planar transparent windows 2 and 3 on opposite walls thereof. The container 1 is filled with a transparent liquid such as water through which ultrasonic energy may be propagated from appropriate transducer means. The transducer means comprises an array of piezoelectric crystals at each end of container 1. The first array comprises crystals 4–8 which are driven in parallel via line 9 and concentrate the generated ultrasonic sound in a plane along the longitudinal axis of symmetry of the cell. In addition to concentrating the sound in a plane, the array of crystals can be designed to concentrate the ultrasonic energy so as to compensate for the energy losses of absorption by the liquid as the acoustical energy is propagated through the cell liquid; and to rapidly diffuse the sonic energy at the end of the scan so that together with absorption of the remaining energy by the end walls of the cell, will result in only a very small amount of energy being reflected back into the cell. A similar array is located in opposition to the first array, at the other end of container 1, and comprises crystals 11–15 and line 16. While the crystal arrays shown have five elements each, the invention is not necessarily limited to this number of crystals or piezoelectric elements per array. Three elements, however, constitute the simplest practical array capable of concentrating and focusing the energy. The number and arrangement of the crystals in an array can be determined from the physical parameters of the cell using Cornu's spiral, or Fresnel's integrals, by those skilled in the art. For convenience, and brevity, throughout the following description the term "video driver" is used to indicate the array comprising crystals 4–8, and the term "writing driver" is used to indicate the array comprising crystals 11–15. The video driver is energized with an amplitude modulated carrier signal, the modulation envelope corresponding to the video intelligence. The writing driver is energized with a single writing pulse, or burst of carrier frequency energy shaped and timed by the video sync signal, at the beginning of each line sweep. The acoustical energy produced by either driver is, in and of itself, insufficient to cause cavitation in the cell liquid. However, a standing wave pattern will be formed by the carrier of the video signal and the carrier of the writing pulse, and the amplitude of this standing wave will be the sum of the amplitudes of the two carriers. This amplitude is designed to be sufficient to cause cavitation, and the amount of cavitation will be proportional to the amplitude of the video signal. Therefore, groups of bubbles will form in the liquid in the sound plane at points where the video signal is present when the writing pulse passes. Each group will consist of a series of lines of bubbles, each line separated by one-half the wavelength of the ultrasonic sound.

Rays of light from a suitable high intensity source (such as an arc, or laser) are directed as a beam 17 into the cell. The emerging beam is diffracted through an angle which is dependent on the wavelengths of the ultrasonic sound generated by the carrier of the video and writing drivers and the light from the source. At 20 megacycles, in water at 50° C., the wavelength is $7.7 \times 10^{-3}$ cm.

In the operation of the cell, lines of microscopically small bubbles are formed as a curtain along the plane of symmetry of the cell and of the crystal array due to cavitation in the liquid. A representative line of bubbles is indicated at 29. The lines of bubbles constitute a diffraction screen for the light rays entering the cell. Both the size of the bubbles and the spacing between the lines of bubbles, as shown in FIGURE 1, have been greatly exaggerated for illustrative purposes. This light diffraction screen changes along the plane of symmetry in accordance with the intensity changes in the video signal supplied to the video driver. The more bubbles in each line, the greater will be the percentage of light diffracted.

Light emerging from the cell is then imaged by a first objective lens (not shown in FIGURE 1) into a Fraunhofer spectrum. The undiffracted rays of which light may be blocked (e.g., rays 18–22) by placing an opaque bar in their path while the diffracted light rays comprising the first and second spectral order bands (e.g., rays 23–25 and 26–28) are allowed to pass. Receiving only the diffracted light, a second objective lens may be used to direct the image from the plane of symmetry of the cell so as to cause it to fall onto a viewing screen. There would then appear on such a screen a narrow horizontal line which would be modulated along its length in accordance with the intensity of the diffraction screen of the cavitation bubbles within the cell. This horizontal line represents one video scan.

It is relatively difficult to induce cavitation in pure water under conditions of high intensity sound. This is due primarily to the surface tension of the water which can sustain very large negative pressures within the body of the liquid. This internal cohesive force can be overcome by dispersing microscopic nuclei such as polystyrene spheres of 0.1 micron diameter, throughout the liquid. These nuclei must be smaller than the wavelength of light, otherwise, they themselves will scatter light and reduce the contrast on the screen. The water within the cell may also be charged with a gas, such as carbon dioxide, which has a high vapor pressure at the operating temperature of the cell. This gas will diffuse into each bubble as it starts to grow from its nucleus, reinforcing its growth rate. Also a suitable agent may be added to the water to reduce its surface tension without wetting the polystyrene spheres (nuclei).

Figure 2:
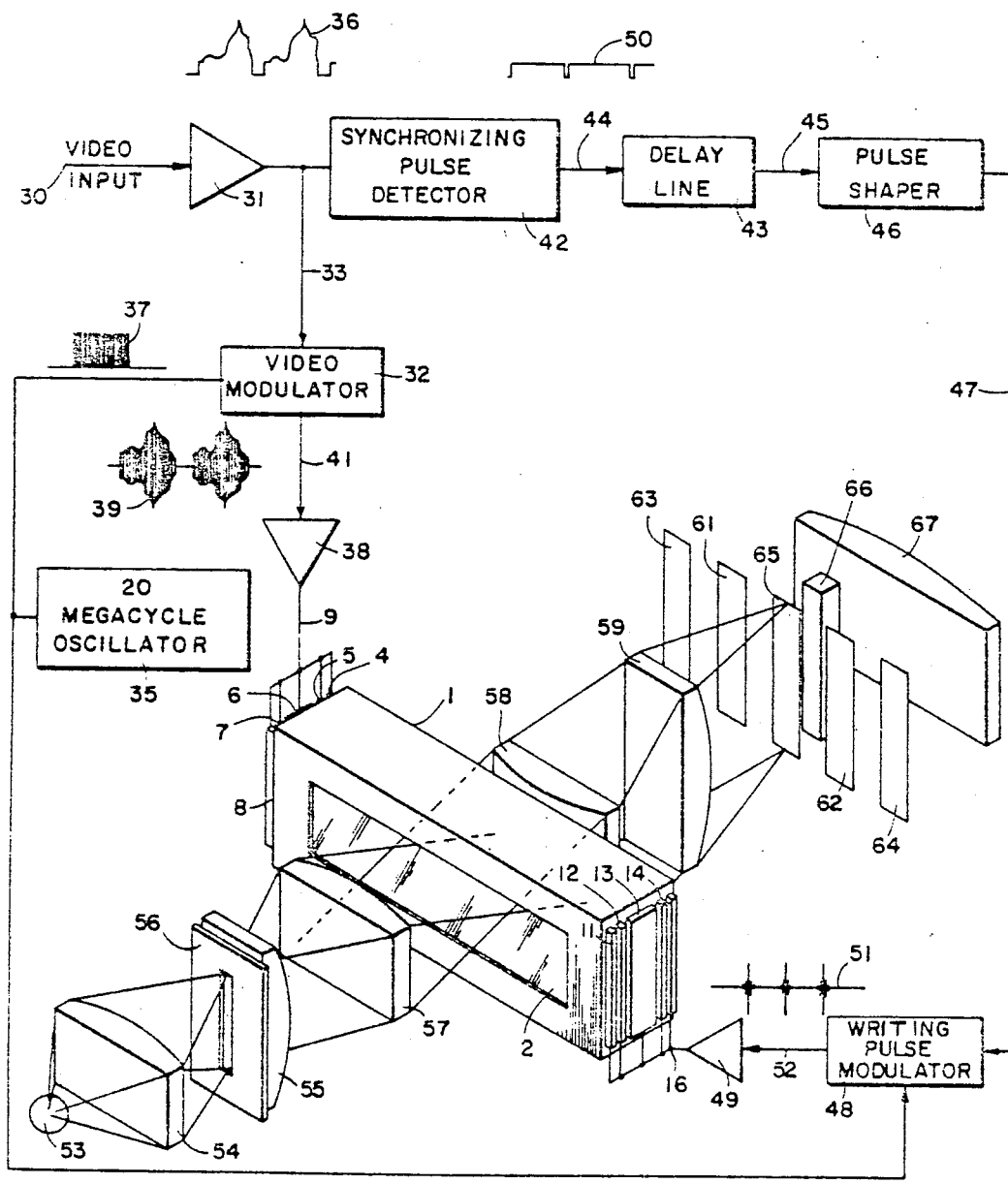
FIGURE 2 is a block diagram of a portion of a display system incorporating the ultrasonic light cell modulator of the invention.

The input information supplied to the video and writing drivers may be obtained from any suitable source such as signal generators, video amplifier, or radars. The useful applications of a system of this nature are many, only one of which is large-screen video displays. As an example of the application of the cell, there is shown in FIGURE 2 a block diagram of a system for displaying a video signal. Video input signals, such as may be obtained from a television transmission system, are supplied on line 30 to video amplifier 31 and then sent to video modulator 32 on line 33. Modulator 32 is supplied with a carrier frequency by a 20 megacycle oscillator 35. A representative video waveform from amplifier 31 is indicated at 36. The waveform of the 20 megacycle carrier is indicated at 37. Video signal 36 modulates the carrier 37 and is sent to video driver amplifier 38 via line 41. The output of video driver amplifier is supplied on line 9 to the video driver (array comprising crystals 4–8). This amplifier (38) maintains the maximum amplitude of the modulated signal (waveform 39) at a level just below the cavitation level of the liquid in the ultrasonic cell. The amplified signal on line 9 is transduced into an ultrasonic signal in the cell.

The synchronizing pulses of the incoming video signal (36) are separated from the video by synchronizing pulse detector 42. These isolated synchronizing pulses are sent to delay line 43 via line 44 where they are delayed by an interval as required by the particular cell design. The delay synchronizing pulses are supplied via line 45 to pulse shaper 46. From the pulse shaper 46, the sync pulses are narrowed as indicated at 50, and sent via line 47 to writing pulse modulator 48 where they modulate a 20-megacycle carrier frequency supplied by 20-megacycle oscillator 35. This carrier frequency is the same as that used for modulating the video input (36). The sync-pulse modulated carrier comprises the writing pulse which is then amplified by the writing pulse amplifier 49. The waveform of the writing pulse is indicated at 51, and appears on line 52. The maximum amplitude of writing pulse 51 is maintained just below cavitation level of the cell liquid, in like manner as in the case of the video modulated carrier (39). The writing pulse 51 is supplied to the writing driver via line 16 where it is converted into an ultrasonic signal, as in the case of the video signal. The writing driver comprises crystals 11–15.

The video ultarsonic signal from the video driver and the synchronizing ultrasonic signal (writing pulse) from the writing driver travel towards each other in the cell liquid. At any one time, there is only one synchronizing pulse within the window area of the cell (e.g., window 2). As this writing pulse first enters the window area, it meets the vanguard of the video signal train from the opposite side, forming a standing wave, the amplitude of which is the sum of the amplitudes of both the video and synchronizing (writing) signals. Since the amplitude of each of these two signals is just below the cavitation level, the final standing wave peaks exceed the cavitation level and cause localized bubble formation. The magnitude of cavitation pressure developed is proportional to the amplitude of the video signal at that point. The number of bubbles formed is a function of the cavitation pressure (as well as the number of nuclei present, which will be present in excess).

The video signal is then made visible as lines of bubbles, to create a modulated diffraction screen for the light beam projected through the cell. The synchronizing pulse continues down the video train, making the video visible as lines and bubbles as it travels along toward the video driver. This constitutes one horizontal scan. At the end of one scan and before the beginning of the next scan, the bubbles will be absorbed back into the cell liquid. This action may be facilitated by momentarily raising the pressure in the cell by another crystal, not shown in FIGURE 2, vibrating at low frequency.

Inasmuch as each of the functional units represented by a block in FIGURE 2, and as described in the foregoing discussion, may be any one of the numerous devices for each respective function well known in the art it is deemed unnecessary to show circuit details.

Ancillary optical elements which may be used to illuminate the cell and project the line scan therefrom, will now be described. Light from any suitable source 53 passes through cylindrical lens 54, which focuses the light into a vertical line coincident with slit 56. This lens has no power in the elevation view. Slit 56 precisely limits the vertical line image. The light from this image then passes through cylindrical lens 55, which images the source as a horizontal line in the center of the cell 1, in the plane of the concentrated ultrasonic sound. This lens has no power in the plan view. The light passing through lens 55 next passes through cylindrical lens 57, which collimates the light from slit 56 in the horizontal direction. This lens has no power in the elevation view and thus does not affect the focusing action of line 55. The light next passes through the cell, and upon emerging from cell passes through cylindrical lens 58 which focuses the light on opaque bar 66. This lens has no power in the elevation view. The light passing through lens 58 next passes through cylindrical lens 59 which focuses the light as a horizontal line on the screen 81. This lens has no power in the plan view and thus does not affect the focusing action of lens 58. Cylindrical lens 67 images the plane of the concentrated ultrasonic sound of cell 1 onto screen 81.

Figure 7:
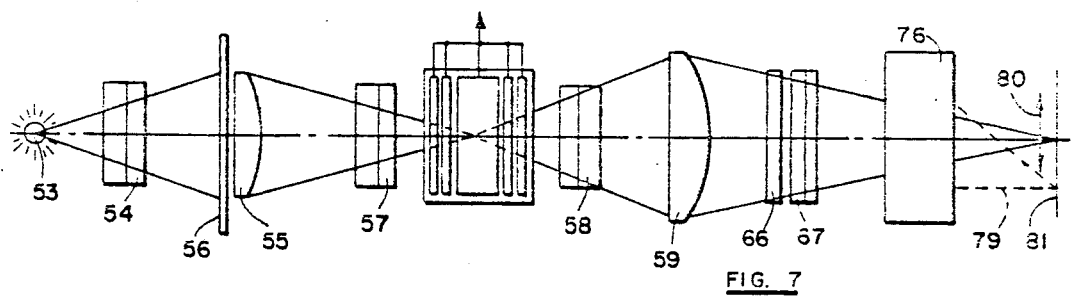
FIGURE 7 is an elevation view of the apparatus of FIGURE 6.
Figure 6:
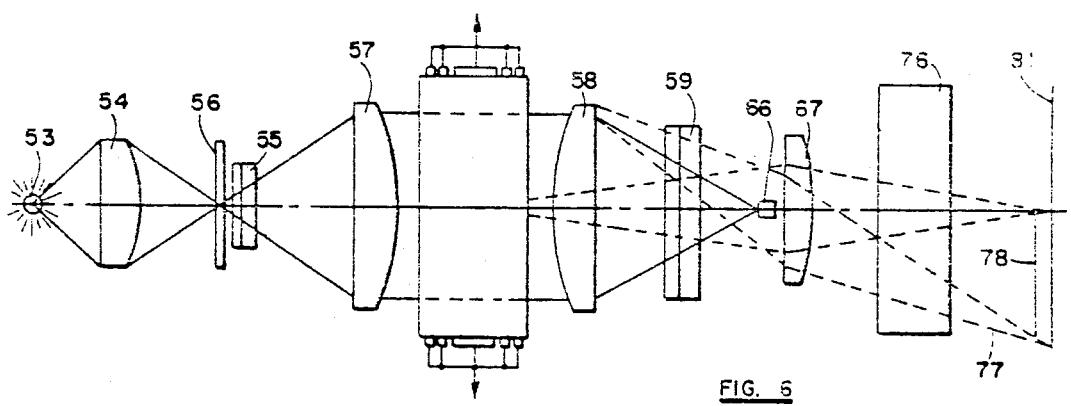
FIGURE 6 is a simplified plan view of a two-dimensional scanning system utilizing the ultrasonic light cell modulator of the invention.

To aid in an understanding of the invention, the path of the light may be retraced from another standpoint. It will be noted that all the lenses are cylindrical; they have power in only one coordinate and not in the other. Therefore in FIGURE 6 the action of only lenses 54, 57, 58, and 67 need be considered, the other lenses have no power in this view and therefore do not influence the direction of the light in the horizontal plane. Similarly, in FIGURE 7 only lenses 55 and 59 need be considered, the other lenses do not influence the direction of light in the vertical plane. In FIGURE 6, which represents the horizontal plane, lens 54 images the light from a source 53 onto slit 56. Lens 57 collimates the light from slit 56, the light then passes through the cell and is focused by lens 58 onto bar 66. Any light deffracted by the cell is focused by lens 67 onto the screen 81. In FIGURE 7 which represents the vertical plane, lens 55 images the light from source 53 onto the center of the cell 1, and the image at this point is reimaged by lens 59 at the screen 81. Vertical scan system 76 has no power in either plane, it merely changes the direction of all rays in the vertical plane by an equal amount to give vertical scan. The rays between lens 59 and screen 81 in FIGURE 7 are shown with the vertical scan system in the neutral position.

Figure 3:
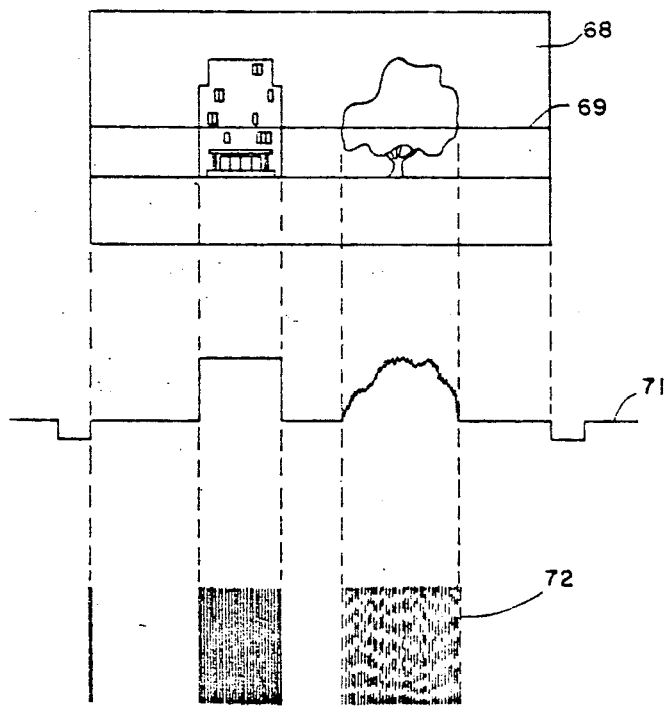
FIGURE 3 is a waveform diagram of assistance in the exposition of the invention.

The emergent light from lens 59 is separated into a plurality of spectral orders in response to diffraction within the cell. First spectral orders are indicated by zones 61 and 62; second spectral orders are represented by zones 63 and 64. In the absence of modulation (viz. diffraction) within the cell, all of the light (while light) will fall in zone 65. Opaque bar 66 is placed in the path of zone 65 in order to block the undiffracted light from reaching second objective lens 67. Diffracted light will pass to either side of bar 66, through the various spectral zones, and be collected and image onto a suitable viewing screen by second objective lens 67. The angle of diffraction is immaterial, provided it is great enough to cause the diffracted rays to avoid striking bar 66. The displayed image will comprise a horizontal line of white light, the intensity of which may vary along its length. FIGURE 3 illustrates the relationship between an image being scanned by the video system, the video signal, and the cavitation bubbles in the ultrasonic cell. The scene or image being scanned is indicated generally at 68, and a particular horizontal line element of the image being scanned is indicated at 69. One line scan or sweep across the width of the image 68 will produce the video signal waveform indicated at 71. This video waveform 71 will in turn generate the pattern of cavitation bubbles indicated at 72. The horizontal coordinates shown in FIGURE 3 are adjusted so that corresponding points are in vertical alignment; that is, the time base of 71 and 72 is adjusted to the distance base of 69.

Figure 4:
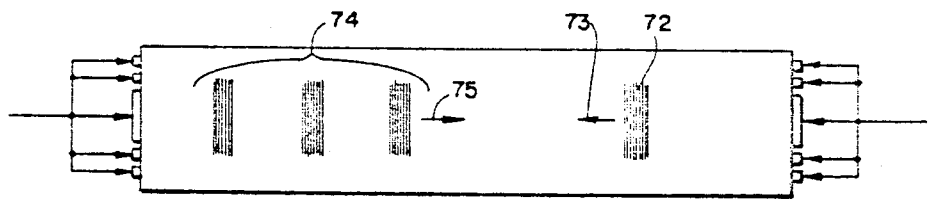
FIGURE 4 is a top view of the apparatus of FIGURE 1 showing a video scan and its inception.
Figure 5:
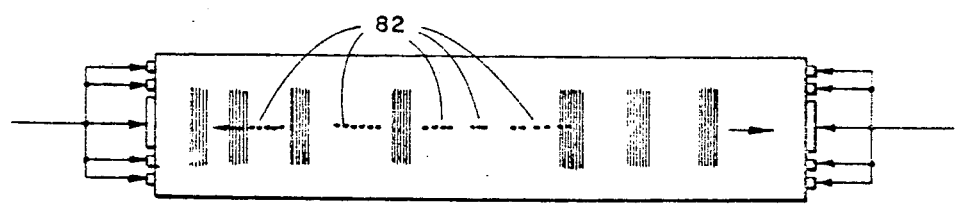
FIGURE 5 is a top view of the apparatus of FIGURE 2 showing a video scan near termination of a single sweep.

FIGURE 4 shows the bubble pattern within the ultrasonic cell, as viewed from above, as a video and writing pulse have just begun to enter the cell. The writing pulse pressure pattern or ensemble is indicated at 72 and progresses in the direction of arrow 73. The video signal pressure pattern of ensemble is indicated at 74 and progresses in the direction of arrow 75. FIGURE 5 shows the cell of FIGURE 4 or some later time, just before the end of the scan when most of the video pulse waves have been converted into bubble ensembles, indicated at 82.

While the ultrasonic light cell apparatus shown in FIGURE 2 is directed solely to means for producing a horizontal scan, it will be recognized by those versed in the art that this apparatus can be readily implemented with added means to obtain vertical scan. Thus, a complete system for two-dimensional large-screen display of input video data could be evolved. FIGURES 6 and 7 depict such an overall system. FIGURE 6 is a plan view of the system showing the optical components of FIGURE 2 plus a vertical scan system 76, dotted lines 77 and arrow 78 show the scan travel. FIGURE 7 is an elevation or side view of the system of FIGURE 6. Dotted lines 79 and arrow 80 illustrate the travel of the vertical scan. The display screen is indicated at 81. The vertical scan system may be any one of a number of suitable and well-known means to provide the required vertical scanning motion to complete the over two-dimensional display system. For example, vertical scanning may be accomplished by a low-speed rotating mirror or by an electronic method of changing the angle of the light beam leaving the horizontal scanning cell.

In summary, ultrasonic light cell modulators of the prior art modulate light passing therethrough by index of refraction anomalies. These anomalies are generated by localized pressures within a compressible medium by a modulated ultrasonic carrier. However, the light rays must pass through a considerable thickness of liquid before light diffraction becomes effective, and the light must be highly collimated. These same pressures are in the liquid of the apparatus of the present invention before and after the writing pulse generates cavitation bubbles, but index refraction anomalies will not create interference in the apparatus of the present invention since the liquid employed in ultrasonic cells heretofore is considerably thinner and the light is not highly collimated.

The basic apparatus of the present invention, as disclosed hereinabove, may be readily modified for use in color image displays. Inasmuch as a spectrum is generated by the ultrasonic modulation technique of the invention, a slit can be appropriately placed in the region of the first order spectrum, 61 and/or 62 of FIGURE 2, to select a certain color of this spectrum. Then, by changing the frequency of the carrier, the spectrum can be swept across the slit and any color selected. In its simplest form such a system would provide control of brightness in the manner described hereinabove and control of hue by frequency. Ancillary means may be provided for control of color saturation, i.e, the purity of the color, or lack of gray. Color also can be added by having multiple systems, one for each color desired, and the colored lights from each system registered on the display screen. Alternatively, color may be added by means of a conventional field-sequential system in which successive frames represent different colors with the color of the light on the display being changed accordingly.

Without further analysis, the foregoing will so fully reveal the essential subject matter of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed is:
1. A device for modulating radiant energy comprising:
   a liquid body located transversely of the path of said radiant energy;
   first means for propagating an acoustical energy pulse into one end of said body in a direction transverse to said path, said acoustical energy pulse having a level below that capable of producing cavitation in said liquid body; and
   second means located at the opposite end of said body for transmitting acoustical energy of varying amplitude transversely to said path and in the opposite direction to said energy pulse propagated by said first means, the summation of said propagated and transmitted energies of said first and second means producing cavitation within said body at their meeting points when the summation of energies equals or exceeds that required for cavitation, the cavitation producing anomalies in said path thereby modulating said radiant energy by diffraction thereof.
2. A device as defined in claim 1 wherein said first acoustical energy propagating means comprises:
   an array of piezoelectric crystals arranged to concentrate said acoustical energy in a plane transverse to said path.
3. A device as defined in claim 1 wherein said second acoustical energy propagating means comprises:
   an array of piezoelectric crystals arranged to concentrate said acoustical energy in a plane transverse to said path.
4. A device as defined in claim 1 wherein said liquid body is confined within a container having two coplanar, spaced apart, transparent walls.
5. A device as defined in claim 1 wherein said liquid body comprises water to which has been added an agent to reduce surface tension and dispersed solid nuclei having diameters smaller than the wavelength of said radiant energy, to promote cavitation.
6. A light cell modulator comprising:
   a source of light;
   a confined body of liquid, transparent to light from said source over a continuous portion thereof;
   first means located at one end of said continuous portion for propagating an acoustical energy pulse along the length of said continuous portion, said level of acoustical energy being below the level required to induce cavitation in said liquid;
   second means located at the opposite end of said continuous body portion for transmitting acoustical energy into said liquid in a direction towards said first means; and
   means for supplying a modulating signal to said second means, the level of the transmitted acoustical energy by said second means varying with said modulating signal as a function of the magnitude of said signal, the acoustical energy of said first and second means being additive within said liquid body at the location of the interface of the two wave fronts to produce cavitation for diffracting said light when the energy sum equals that required for cavitation, the extent of cavitation and resulting diffraction being directly proportional to the sum of the combined acoustical energies at the meeting point.

References Cited

UNITED STATES PATENTS

| 2,234,329 | 3/1941 | Wolff | 350—161 X |
| 2,267,251 | 12/1941 | Okolicsanyi | 350—161 X |
| 3,121,169 | 2/1964 | Benton | 350— 161 X |
| 3,291,554 | 12/1966 | Price | 350—285 |
| 3,306,977 | 2/1967 | Brueggemann | 178—7.6 |

JEWELL H. PEDERSEN, *Primary Examiner.*

E. S. BAUER, *Assistant Examiner.*